US009979698B2

(12) United States Patent
Visser et al.

(10) Patent No.: US 9,979,698 B2
(45) Date of Patent: May 22, 2018

(54) LOCAL INTERNET WITH QUALITY OF SERVICE (QOS) EGRESS QUEUING

(71) Applicant: iPhotonix, Richardson, TX (US)

(72) Inventors: Lance Arnold Visser, Dallas, TX (US); Son Thanh Tran, Dallas, TX (US); Russell Wiant, Carrollton, TX (US)

(73) Assignee: iPhotonix, Richardson, TX (US)

( * ) Notice: Subject to any disclaimer, the term of this patent is extended or adjusted under 35 U.S.C. 154(b) by 55 days.

(21) Appl. No.: 14/749,163

(22) Filed: Jun. 24, 2015

(65) Prior Publication Data

US 2015/0381569 A1 Dec. 31, 2015

Related U.S. Application Data

(60) Provisional application No. 62/018,389, filed on Jun. 27, 2014.

(51) Int. Cl.
G06F 9/00 (2006.01)
H04L 29/06 (2006.01)
H04L 12/721 (2013.01)

(52) U.S. Cl.
CPC .......... *H04L 63/0272* (2013.01); *H04L 45/26* (2013.01); *H04L 63/029* (2013.01)

(58) Field of Classification Search
CPC .... H04L 63/0272; H04L 45/26; H04L 63/029
USPC ............................................... 726/15, 13, 11
See application file for complete search history.

(56) References Cited

U.S. PATENT DOCUMENTS 9,430,256 B2 8/2016 Raghu
9,450,817 B1 9/2016 Bahadur et al.

| | | | |
|---|---|---|---|
| 2002/0097730 A1* | 7/2002 | Langille | H04L 12/4641 370/401 |
| 2005/0141518 A1 | 6/2005 | Schiller et al. | |
| 2006/0056297 A1* | 3/2006 | Bryson | H04L 63/104 370/230 |
| 2006/0209830 A1 | 9/2006 | Oguchi et al. | |
| 2007/0064704 A1 | 3/2007 | Balay et al. | |
| 2008/0095054 A1 | 4/2008 | Morford | |
| 2009/0144819 A1 | 6/2009 | Babbar et al. | |

(Continued)

OTHER PUBLICATIONS

"CPE WAN Management Protocol," TR-069, Issue 1, Amendment 5, CWMP Version 1.4, Broadband Forum, Nov. 2013, 228 pages.

(Continued)

*Primary Examiner* — Shewaye Gelagay
*Assistant Examiner* — Carlton Johnson
(74) *Attorney, Agent, or Firm* — Slater Matsil, LLP

(57) ABSTRACT

Local internet functionality may allow host devices positioned in branch office locations to securely communicate outgoing internet traffic directly over the internet. Local internet functionality may also allow said host devices to securely receive incoming internet traffic through the creation and tracking of local internet sessions. Local internet functionality is achieved by forwarding egress internet traffic over a local internet virtual pathway extending to a WAN interface/port of a local host device. The WAN interface/port is configured to communicate traffic received over the local internet virtual pathway directly over the internet, while communicating all other egress traffic over secure tunnels of the virtual edge router. The WAN interface/port is further configured to monitor outgoing local internet traffic to create and track local internet sessions.

19 Claims, 14 Drawing Sheets

(56) References Cited

U.S. PATENT DOCUMENTS

| | | |
|---|---|---|
| 2009/0279550 A1 | 11/2009 | Romrell et al. |
| 2010/0142369 A1 | 6/2010 | Gottwerth et al. |
| 2010/0284407 A1 | 11/2010 | Leelanivas et al. |
| 2011/0170865 A1 | 7/2011 | Zheng |
| 2012/0106559 A1 | 5/2012 | Kim et al. |
| 2012/0160559 A1 | 6/2012 | Tsutsumi et al. |
| 2012/0170578 A1 | 7/2012 | Anumala et al. |
| 2012/0263041 A1 | 10/2012 | Giaretta et al. |
| 2012/0263183 A1 | 10/2012 | Weill et al. |
| 2012/0311568 A1 | 12/2012 | Jansen |
| 2013/0182605 A1 | 7/2013 | So et al. |
| 2013/0211549 A1 | 8/2013 | Thakkar et al. |
| 2013/0287037 A1 | 10/2013 | Bush et al. |
| 2013/0305344 A1 | 11/2013 | Alicherry et al. |
| 2014/0064283 A1 | 3/2014 | Balus et al. |
| 2014/0133354 A1 | 5/2014 | Scharf et al. |
| 2014/0351452 A1 | 11/2014 | Bosch et al. |
| 2015/0023357 A1 | 1/2015 | Imai |
| 2015/0043350 A1 | 2/2015 | Basilier |
| 2015/0188943 A1 | 7/2015 | Williams et al. |
| 2015/0195178 A1 | 7/2015 | Bhattacharya et al. |
| 2015/0271011 A1 | 9/2015 | Neginhal et al. |
| 2015/0326535 A1 | 11/2015 | Rao et al. |

OTHER PUBLICATIONS

"Wireless LAN Controller (WLC) FAQ," Oct. 8, 2009, http://www.cisco.com/c/en/us/support/docs/wireles/4400-series-wireless-lan-controllers/69561-wlc-faq.pdf.

\* cited by examiner

LOCAL INTERNET WITH QUALITY OF SERVICE (QOS) EGRESS QUEUING This patent application claims priority to U.S. Provisional Application No. 62/018,389, filed on Jun. 27, 2014 and entitled "Local Internet with Quality of Service (QoS) Egress Queuing," which is hereby incorporated by reference herein as if reproduced in its entirety.

CROSS-REFERENCE TO RELATED APPLICATIONS

This patent application is related to U.S. patent application Ser. No. 14/749,081, U.S. patent application Ser. No. 14/749,231, U.S. patent application Ser. No. 14/749,317, and U.S. patent application Ser. No. 14/749,365, each of which are incorporated by reference herein as if reproduced in their entireties.

TECHNICAL FIELD

The present invention relates generally to telecommunications, and in particular embodiments, to techniques and mechanisms for local internet with quality of service (QoS) egress queuing.

BACKGROUND

Small and medium businesses (SMBs) are becoming increasingly data intensive as industries adapt to the information age. This has created a demand for cost-effective network solutions capable of efficiently delivering services across distributed locations in a secure and reliable manner. Notably, conventional enterprise networks are designed primarily for large corporations, and may be ill-suited for many SMB applications. Specifically, conventional enterprise networks typically require technical support at the network edge in order to deploy and service network equipment in remote office locations. Since many SMB clients do not employ on-site information technology (IT) personnel, the deployment and maintenance of conventional enterprise network equipment in SMB remote offices may require service calls by certified technicians, which may significantly increase the up-front and/or operational expenses of providing conventional enterprise networks to SMB clients. Accordingly, techniques and systems for providing affordable, yet capable, network solutions to SMB clients are desired.

SUMMARY OF THE INVENTION

Technical advantages are generally achieved, by embodiments of this disclosure which describe local internet with quality of service (QoS) egress queuing.

In accordance with an embodiment, a method for providing efficient internet access to distributed hosts of a virtual edge router is provided. In this example, the method includes establishing data tunnels between a wide area network (WAN) interface of a local host device and WAN interfaces of a plurality of remote host devices, identifying a WAN interface of a first remote host device as a primary internet interface of the virtual edge router, and creating, within the local host device, a local internet virtual pathway for transporting local internet traffic to the WAN interface of the local host device. The WAN interface of the local host device is configured to forward local internet traffic received on the local internet virtual pathway directly over the internet. The method further includes receiving a first data packet from a source device over a local area network (LAN) interface of the local host device, classifying a first data packet as local internet traffic, and forwarding the first data packet over the local internet virtual pathway to prompt the WAN interface of the local host device to communicate the first data packet directly over the internet. An apparatus and computer program product for performing this method are also provided.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1A:
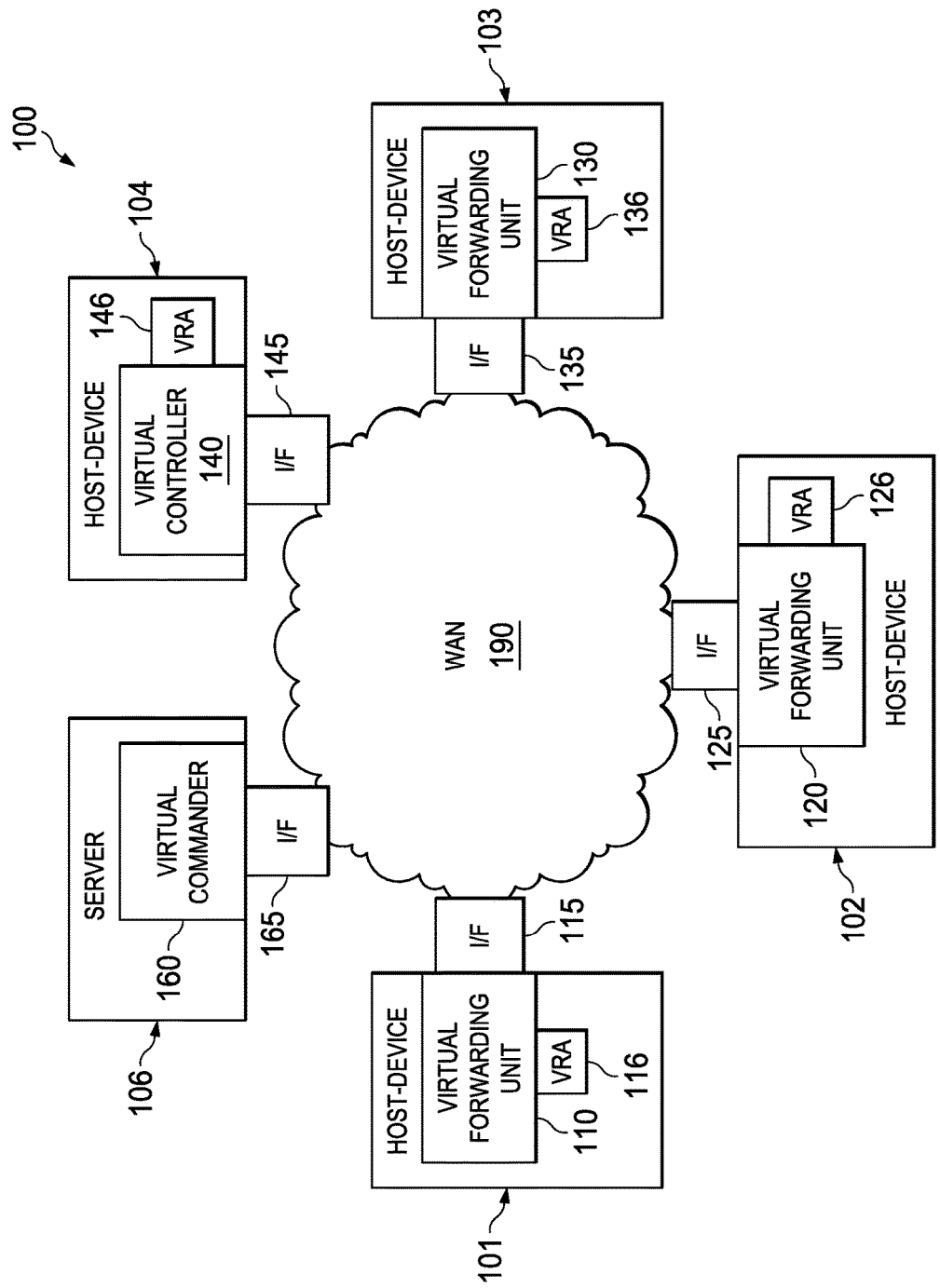
FIGS. 1A-1E illustrate diagrams of an embodiment virtual edge router network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims. While much of this disclosure discusses virtual networking solutions for SMB clients, those of ordinary skill in the art will recognize that the underlying concepts are scalable to any size system, including (but not limited to) large enterprise networks. Various concepts are disclosed in U.S. Provisional Patent Application 62/018,350, U.S. Provisional Patent Application 62/018,389, U.S. Provisional Patent Application 62/018,398, U.S. Provisional Patent Application 62/018,408, U.S. Provisional Patent Application 62/018,421, U.S. Provisional Patent Application 62/018, 433, U.S. Provisional Patent Application 62/018,443 are, each of which are incorporated by reference herein as if reproduced in their entireties.

Innovative virtual networking architectures are described by U.S. patent application Ser. No. 14/749,081. As described therein, embodiment virtual edge routers include virtual data forwarding units instantiated on host devices positioned at remote office locations of an SMB client, as well as well as a data plane that communicatively couples the virtual data forwarding units to one another. Notably, the data-plane includes data tunnels directly interconnecting wide area network (WAN) interfaces of each host device with WAN interfaces of every other host device in the virtual edge router, which serves to provide a direct data path connection between each pair of virtual data forwarding units.

Generally speaking, the WAN interface of a host device positioned at the head-office location is the primary internet interface for virtual edge routers, while WAN interfaces of host devices positioned at branch-office locations primarily serve to communicate tunneled packets within the virtual edge routing network. Indeed, the WAN interfaces at branch-office locations may be transparent from an external network perspective, which may provide security benefits through the centralized filtering and processing of ingress/egress internet traffic. However, tunneling internet traffic from branch-office locations to the head-office locations (and vice-versa) may introduce latency into the communication stream as well as increase congestion/processing-load of the host device positioned in the head-office location. Accordingly, techniques for securely communicating incoming/outgoing internet traffic of a branch office location directly over the internet are desired.

Aspects of this disclosure provide techniques for achieving local internet functionality such that host devices positioned in branch office locations can securely communicate outgoing internet traffic directly over the internet. The local internet functionality may also allow said host devices to securely receive incoming internet traffic through the creation and tracking of local internet sessions. In an embodiment, local internet functionality is achieved by forwarding egress internet traffic over a local internet virtual pathway extending to a WAN interface/port of a local host device. The WAN interface/port is configured to communicate traffic received over the local internet virtual pathway directly over the internet, while communicating all other egress traffic over secure tunnels of the virtual edge router. The WAN interface/port is further configured to monitor outgoing local internet traffic to create and track local internet sessions. The local internet sessions may correspond to entries in a filtering table that associate a destination IP address of the outgoing local internet traffic with header information of the outgoing local internet traffic (e.g., port numbers, etc.), and may be used to filter non-tunneled traffic to distinguish secure local internet traffic from potentially harmful traffic. Local internet sessions may have a finite lifetime, and may be terminated upon the expiration of timer. These and other aspects are explained in greater detail below.

FIGS. 1A-1D illustrate a virtual edge router 100 comprising a plurality of virtual data forwarding units 110, 120, 130, a virtual controller 140, and a plurality of virtual remote agents 116, 126, 136, 146. The virtual forwarding units 110, 120, 130, the virtual controller 140, and the virtual remote agents 116, 126, 136, 146 (referred to collectively as "virtual components") may comprise any hardware, software, or combinations thereof within the host devices 101-104. For example, one or more of the virtual components 110-146 may be a virtual machine instantiated on a corresponding one of the host devices 101-104. As another example, one or more of the virtual components 110-146 may be a dedicated hardware component (e.g., application-specific integrated circuits (ASICs), field-programmable gate arrays (FPGAs), etc.) housed by a corresponding one of the host devices 101-104. For purposes of this disclosure, an object "instantiated" on a host device refers to any instance of software and/or hardware installed-on and/or housed-by the host device. The virtual edge router 100 may be managed by a virtual commander 160, which may be instantiated on a server 106. As used herein, the term "server" may refer to any component or collection of components maintained by a managed service provider. For example, the server 106 may correspond to a network of computing devices in a cloud computing data center or in a network of distributed data centers. As shown in FIG. 1A, the host devices 101, 102, 103, 104 and the server 106 comprise wide area network (WAN) interfaces 115, 125, 135, 145, 165 (respectively) configured to communicate over a wide area network 190.

Figure 1B:
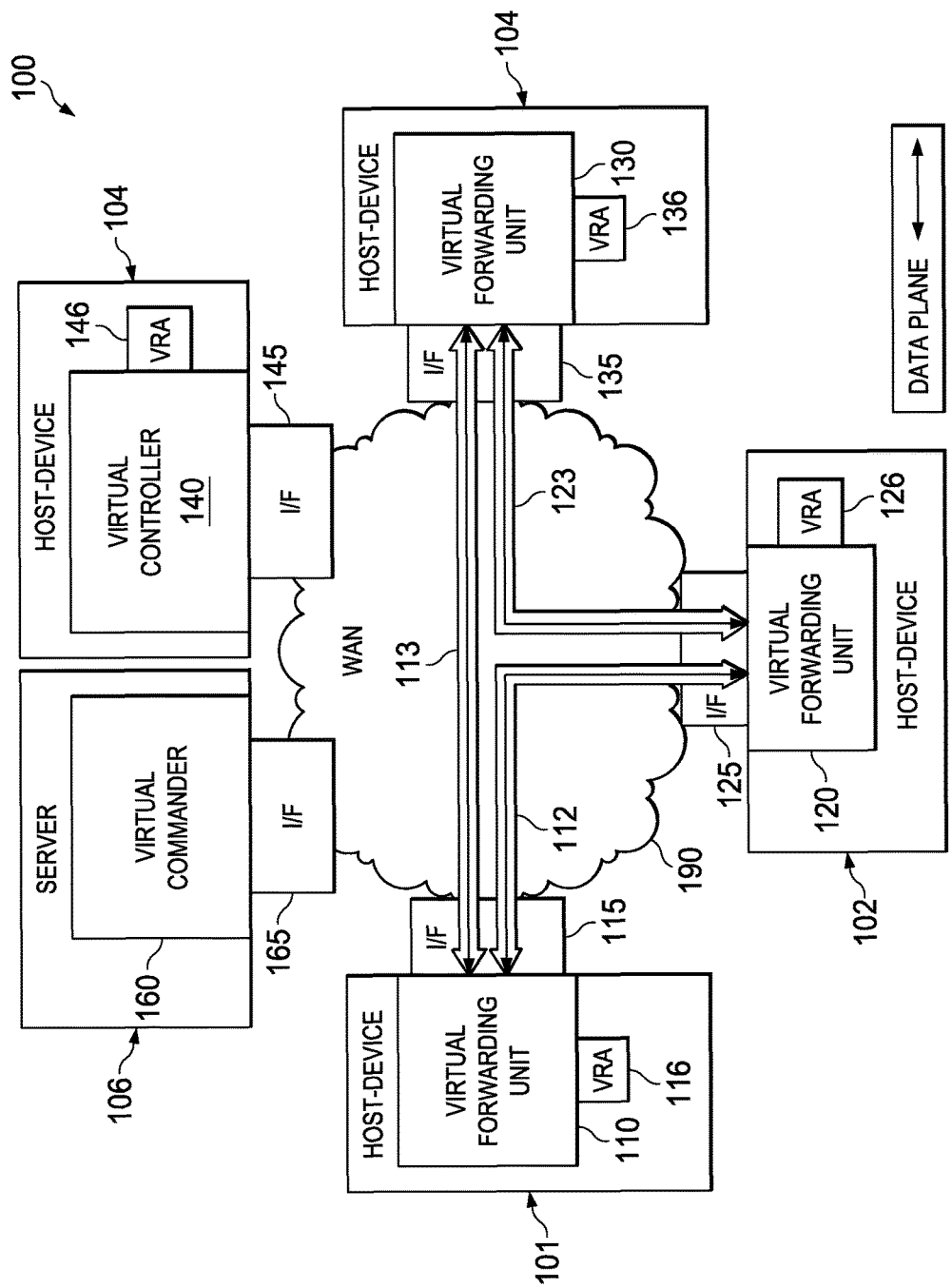

The virtual forwarding units 110-130 are data plane entities of the virtual edge router 100. The terms "virtual forwarding unit," "virtual data forwarding unit," and "virtual forwarding switch" (vFS) are used interchangeably throughout this disclosure. As shown in FIG. 1B, the virtual forwarding units 110, 120, 130 are interconnected to one another via data tunnels 112, 113, 123 extending between WAN interfaces 115, 125, 135 of the host devices 101-103. The data tunnels 112, 113, 123 collectively form a data plane of the virtual edge router 100, and correspond to virtual data pathways through the WAN 190 that are secured by a network tunneling protocol. The virtual forwarding units 110, 120, 130 may be configured to forward data packets over the data tunnels 112, 113, 123. Data packets forwarded over the data tunnels 112, 113, 123 may be transported over the WAN 190 without exiting the data plane of the virtual edge router 100. In embodiments, the virtual forwarding units 110, 120, 130 and/or or the host devices 101-103 may include LAN interfaces for communicating over a local area network with devices (e.g., computers, printers, etc.) in a remote office of an SMB client. The LAN interfaces of the virtual forwarding units 110, 120, 130 and/or or the host devices 101-103 may collectively represent LAN interfaces (or local/private interfaces) of the virtual edge router 100.

Figure 1C:
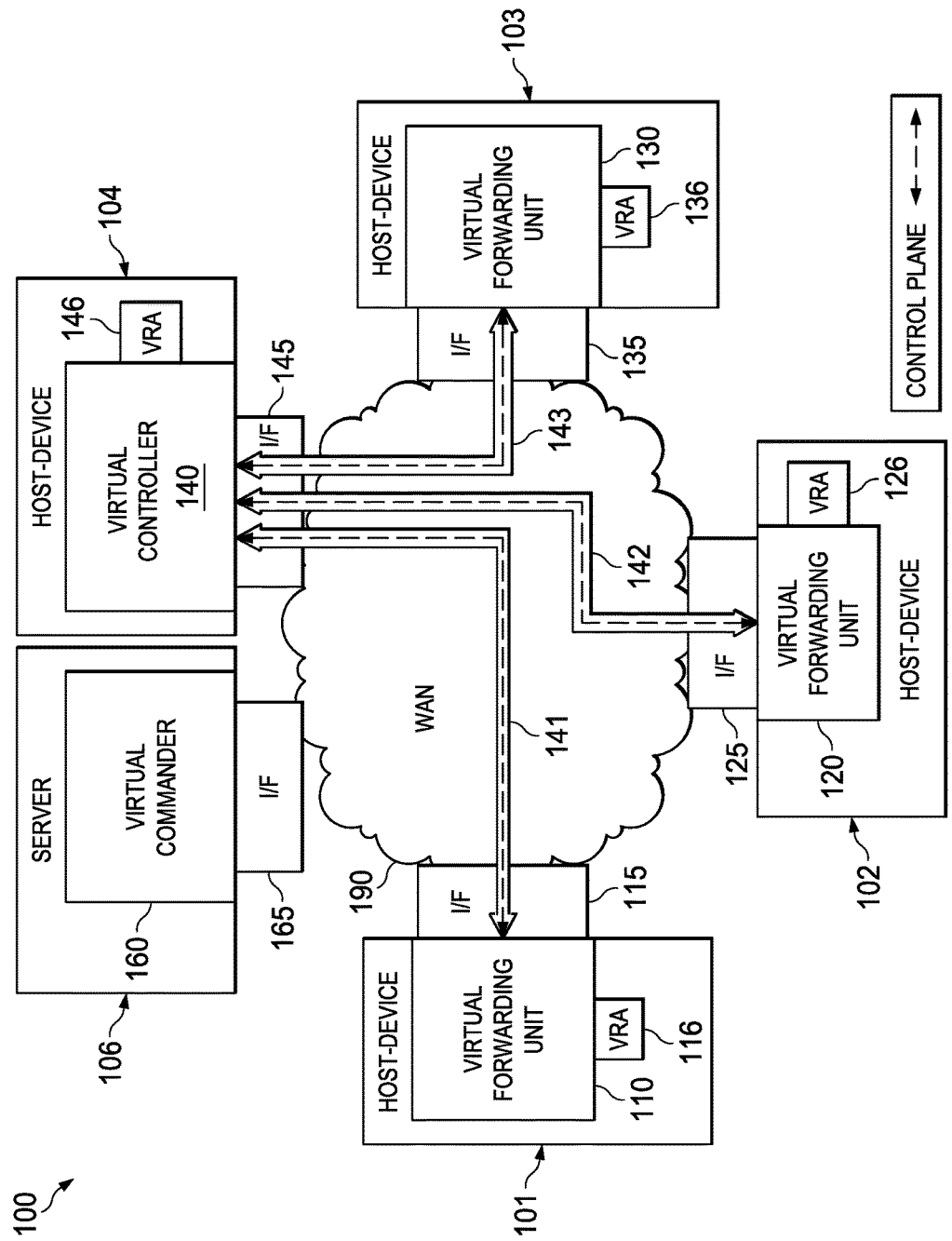

The virtual controller 140 is a control plane entity of the virtual edge router 100. The terms "virtual controller," "virtual network controller," and "virtual flow controller" (vFC) are used interchangeably throughout this disclosure. As shown in FIG. 1C, the virtual controller 140 is connected to each of the virtual forwarding units 110, 120, 130 via control tunnels 141, 142, 143 extending from the WAN interface 145 of the host device 104 to each of the WAN interfaces 115, 125, and 135 of the host devices 101-103. The control tunnels 141, 142, 143 collectively form a control plane of the virtual edge router 100. The virtual controller 140 may be configured to forward control packets over the control tunnels 141, 142, 143. Control packets forwarded over the control tunnels 141, 142, 143 may be transported over the WAN 190 without exiting the control plane of the virtual edge router 100. The virtual controller 140 may update and/or manage tables (e.g., routing, egress, etc.) in the virtual data forwarding units 110, 120, 130 via control signaling communicated over the control tunnel 141, 142, 143.

Figure 1D:
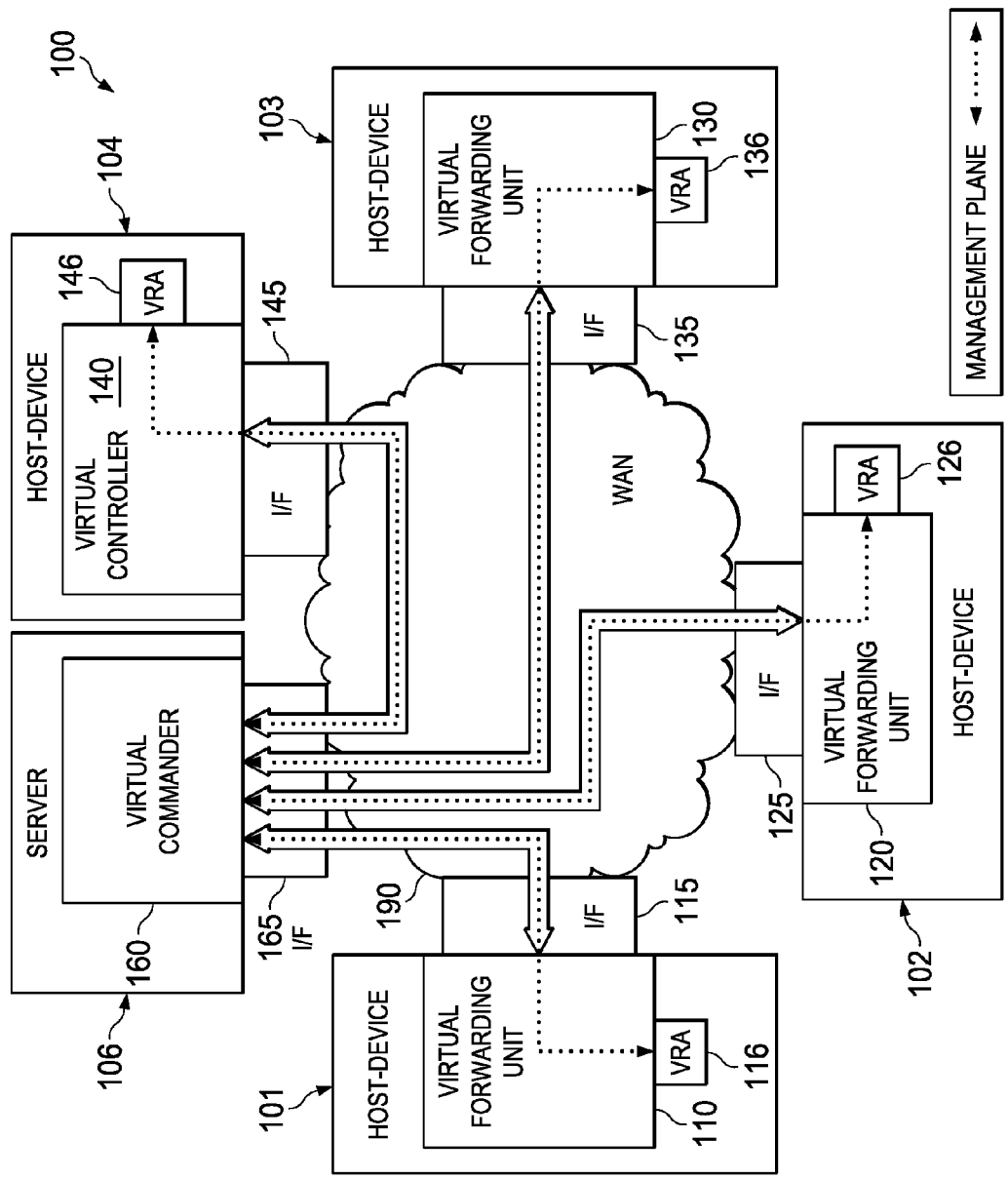

The virtual remote agents 116, 126, 136, 146 are management plane entities of the virtual edge router 100. The terms "remote agent" and "virtual remote agent" (vRA) are used interchangeably throughout this disclosure. The virtual commander 160 may be an internal management plane entity within the virtual edge router 100, or an external management device configured to manage the virtual edge router 100. The terms "virtual commander" and "virtual network commander" (vNetComm) are used interchangeably throughout this disclosure refer to management applications in a management server. As shown in FIG. 1D, the virtual commander 160 is connected to each of the virtual remote agents 116, 126, 136, 146 via management signaling, which is transported over management tunnels 161, 162, 163 extending from the WAN interface 165 of the server 106 to each of the WAN interfaces 115, 125, 135, 145 of the host devices 101-104. The virtual remote agents 116, 126, 136, 146 and the virtual commander 160 may be configured to forward management packets over the management tunnels 161, 162, 163. Management packets forwarded over the management tunnels 161, 162, 163 may be transported over the WAN 190 without exiting the management plane of the virtual edge router 100.

Figure 1E:
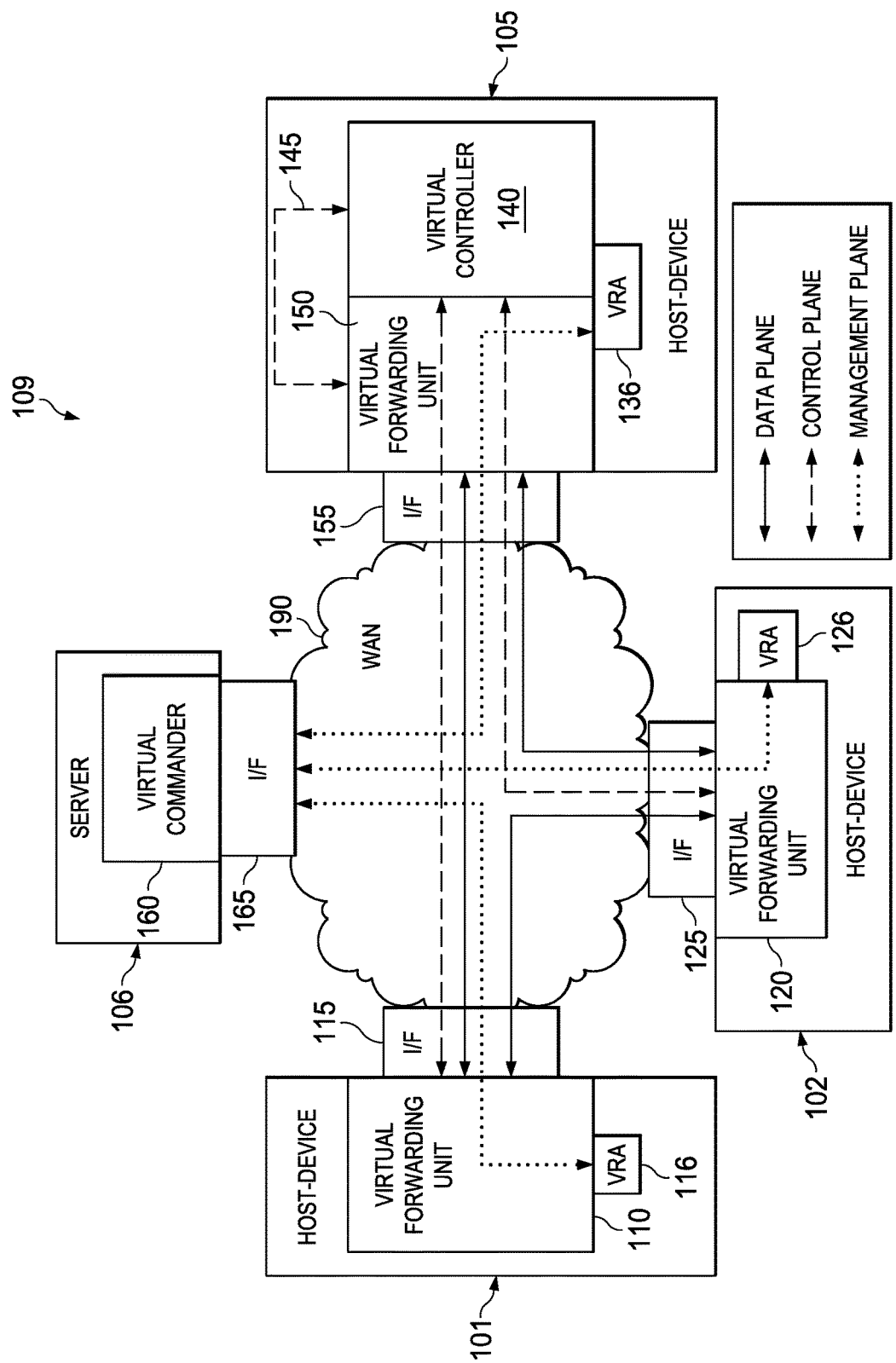

In some embodiments, a virtual controller may be co-located with a virtual forwarding unit in a common host device. FIG. 1E illustrates an embodiment virtual edge router 109 in which the virtual controller 140 and is co-located with a virtual forwarding unit 150 in a host device 105. The host device 105 includes a virtual remote agent 136 configured to manage the virtual controller 140 and the virtual forwarding unit 150. As shown, the virtual controller 140 and the virtual forwarding unit 150 share a common WAN interface 155 of the remote device, and an internal control path 145 extends between the virtual controller 140 and the virtual forwarding unit 150. While the virtual edge router 109 includes data, control, and management tunnels, those tunnels have been omitted from FIG. 1E for purposes of clarity and concision.

The data tunnels 112, 113, 123, control tunnels 141, 142, 143, and management tunnels 161, 162, 163 (referred to collectively as "tunnels") correspond to virtual pathways through the WAN 190 that are secured through one or more network tunneling protocols. In one embodiment, the same tunneling protocol is used for each of the tunnels 112-113, 123, 141-143, 161-163. In another embodiment, different tunneling protocols are used for different tunnel classifications. For example, a different tunneling protocol may be used for the data tunnels 112-113, 123 than for the control tunnels 141-143. In yet other embodiments, different tunneling protocols are used for tunnels within the same tunnel classification. For example, a different tunneling protocol may be used for the data tunnel 112 than for the data tunnel 123. Tunneling protocols may use data encryption to securely transport payloads over the WAN 190. The WAN 190 may include any wide area network or collection of wide area networks. In an embodiment, the WAN 190 corresponds to a public internet. In another embodiment, the WAN 190 corresponds to a private internet protocol (IP) network. In yet other embodiments, the WAN 190 includes a collection of public and private IP networks. The WAN 190 is not limited to IP networks, and may include networks operating under any other network delivery protocol. Unless otherwise specified, the term "wide area network" is used loosely throughout this disclosure to refer to any network (or collection of networks) that serve to interconnect two or more local area networks (LANs).

Figure 2:
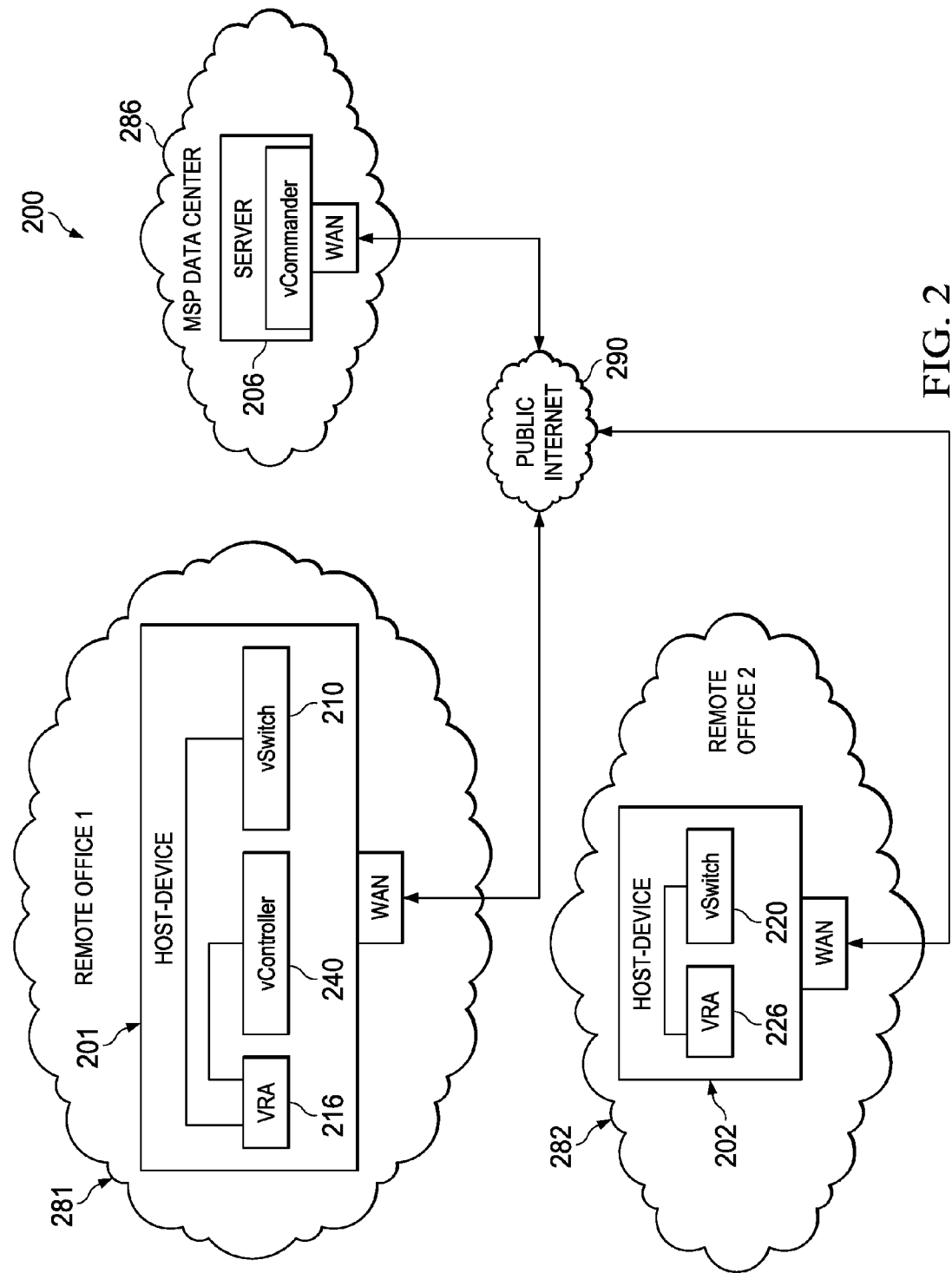
FIG. 2 illustrates a diagram of another embodiment virtual edge router networks.

In some embodiments, a virtual commander may be positioned in a management facility (or network of facilities) maintained by a managed service provider (MSP), while virtual components (e.g., virtual forwarding units, virtual controller, virtual remote agent, etc.) may be instantiated on host devices distributed across multiple remote office locations of an SMB client. FIG. 2 illustrates a virtual edge router 200 comprising a virtual data forwarding unit 210, a virtual remote agent 216, and a virtual controller 240 instantiated on a host-device 201 in a remote office 281, and a virtual data forwarding unit 220 and a virtual remote agent 226 instantiated on a host-device 202 in a remote office 282. The remote offices 281, 282 are interconnected with one another, as well as with a server 206 in a managed service provider data center 286, via a public internet 290. As discussed herein, remote office locations housing a virtual controller are referred to as head-office locations, while remote office locations housing a virtual forwarding switch (but not a virtual network controller) are referred to as branch-office locations.

Figure 3:
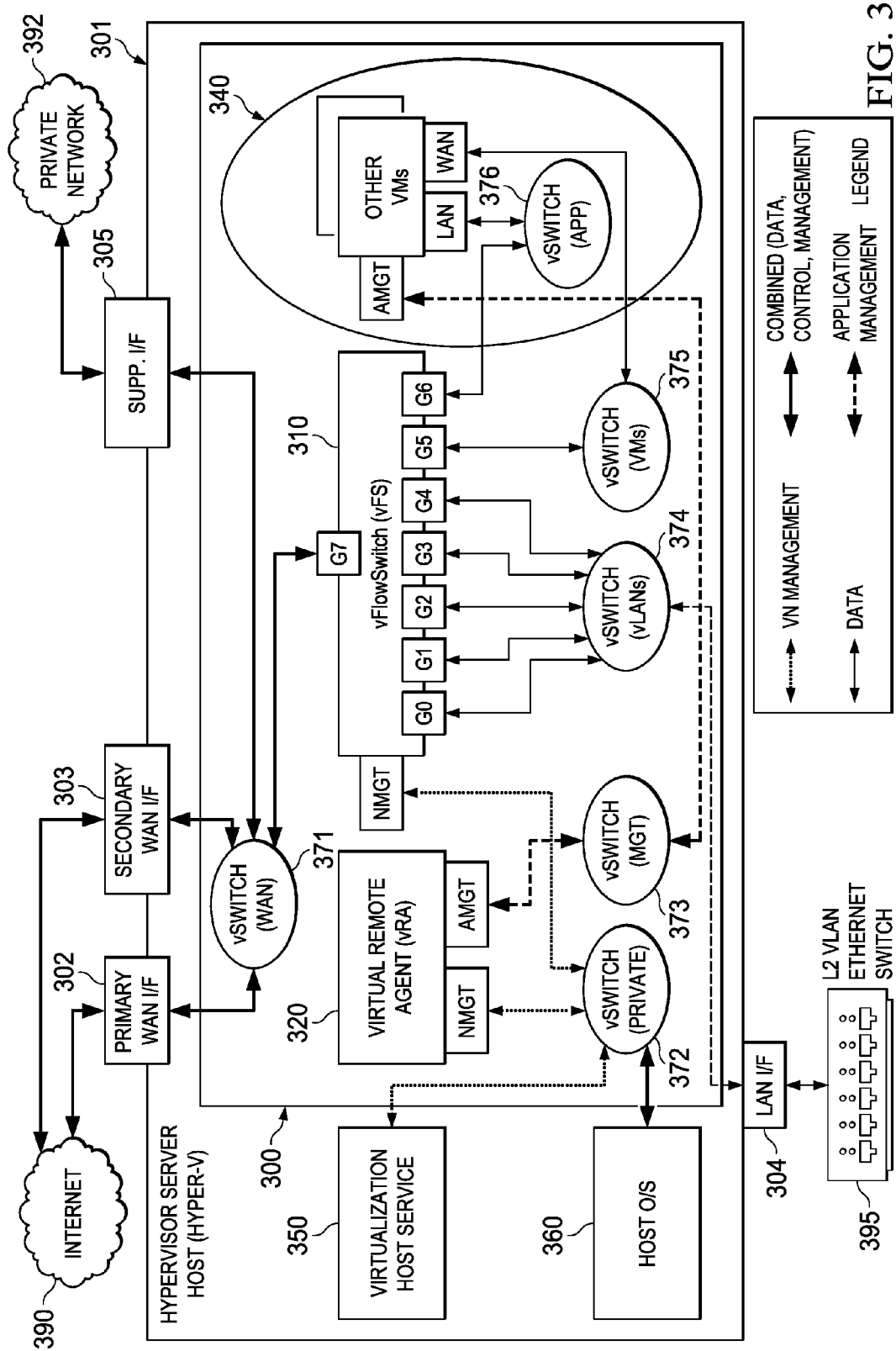
FIG. 3 illustrates a diagram of an embodiment virtual architecture for a distributed host device.

Embodiments of this disclosure provide virtual architectures for distributed host devices. FIG. 3 illustrates an embodiment virtual architecture 300 for a distributed host device 301 positioned in a branch office of a SMB client. As shown, the host device 301 includes a primary WAN interface 302 and a secondary WAN interface 303 configured to communicate over the internet 390, a LAN interface 304 configured to communicate with internal destinations via a virtual LAN (VLAN) Ethernet switch 395, and a supplemental interface 305 configured to communicate over a private network, e.g., a multi-protocol label switching (MPLS) network 392, etc. The host device 301 includes a virtual flow switch 310, a virtual remote agent 320, a plurality of virtual machines 340, and a virtualization host service 350, which are collectively referred to as virtual components 310-350. The virtual components 310-350 and a host operating system 360 are interconnected via links and virtual switches 371-376. These links are classified as combined links, data links, virtual network (VN) management links, and application management links, as indicated by the legend. Other link classifications may also be included in the virtual architecture 300.

Figure 4:
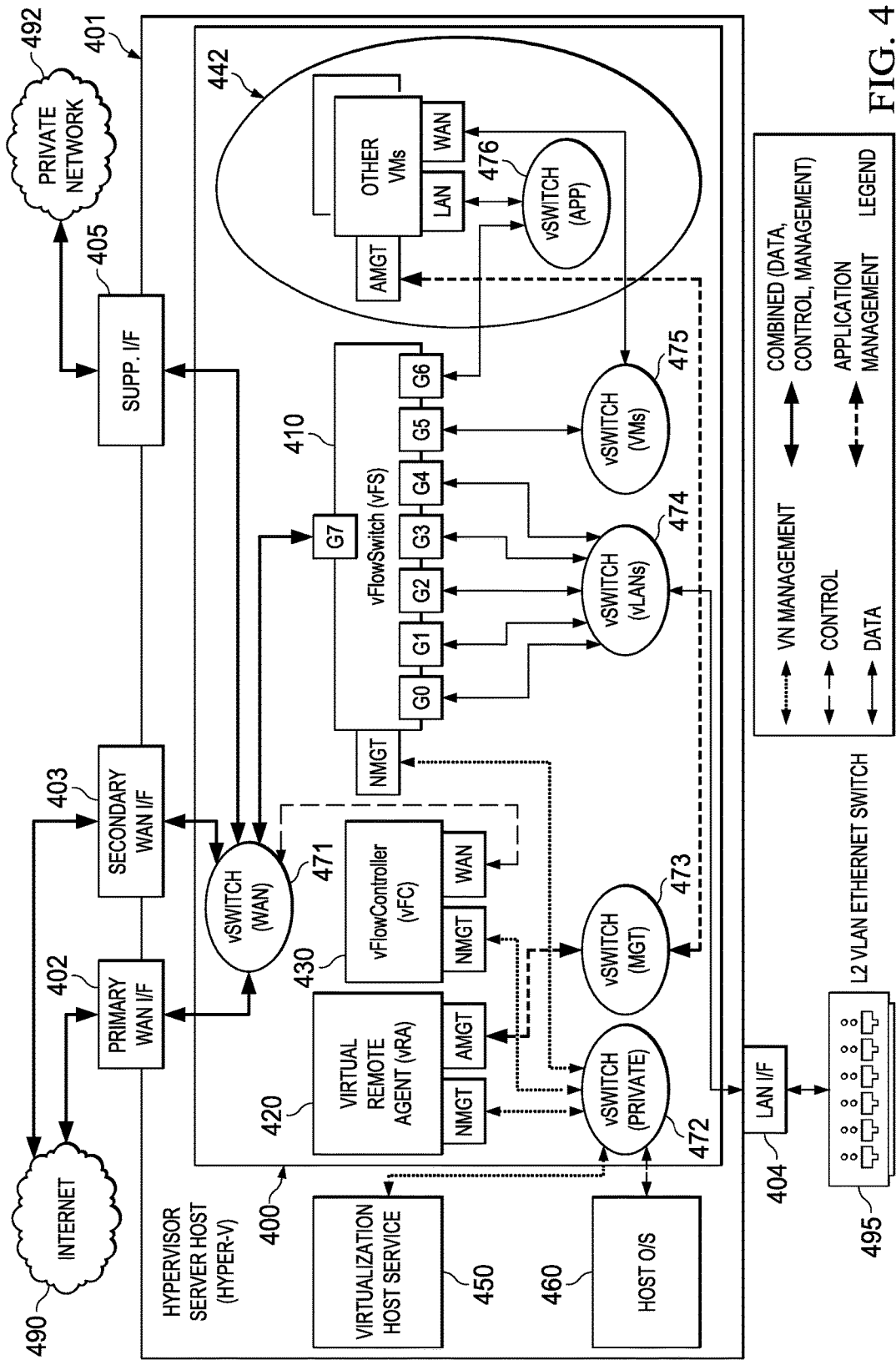
FIG. 4 illustrates a diagram of another embodiment virtual architecture for a distributed host device.

FIG. 4 illustrates an embodiment virtual architecture 400 for a distributed host device 401 positioned in a head office of an SMB client. As shown, the host device 401 includes a primary WAN interface 402 and a secondary WAN interface 403 configured to communicate over the internet 490, a LAN interface 404 configured to communicate with internal destinations via a virtual LAN (VLAN) Ethernet switch 495, and a supplemental interface 405 configured to communicate over a private network 492, e.g., a multi-protocol label switching (MPLS) network, etc. The host device 401 includes a virtual flow switch 410, a virtual remote agent 420, a virtual controller 430, a plurality of virtual machines 440, and a virtualization host service 450, which are collectively referred to as virtual components 410-450. The virtual components 410-450 and a host operating system 460 are interconnected via links and virtual switches 471-476. The links interconnecting the virtual components 410-460 and the host operating system 460 are classified as combined links, data links, control links, VN management links, and application management links, as indicated by the legend. Other link classifications may also be included in the virtual architecture 400.

The combined data links in the virtual architectures 300, 400 may include each of the other link classifications. For example, the combined data links in the virtual architectures 300, 400 may include a multiplexed combination of data links, control links, virtual network (VN) management links, and application management links. The data links may carry data in the virtual edge network. The data may include incoming data communicated from an external source (e.g., from the internet 390, 490) to an internal destination (e.g., device connected to Ethernet switch 395, 495), as well as outgoing data communicated from an internal source to an external destination. The data may also include internal data communicated from an internal source to an internal destination. The control links may carry control signaling in the virtual edge network. Control signaling may include signaling communicated from the virtual controller 430 to other virtual machines in the virtual edge network, e.g., the virtual flow switches 310, 410, etc., and vice-versa. The VN management links and application management links may carry management signaling in the virtual edge network. Management signaling may include signaling communicated from a virtual commander to one of the virtual remote agents 320, 420, as well as signaling instructions communicated from the virtual remote agents 320, 420 to other virtual machines in the virtual edge network.

Figure 5:
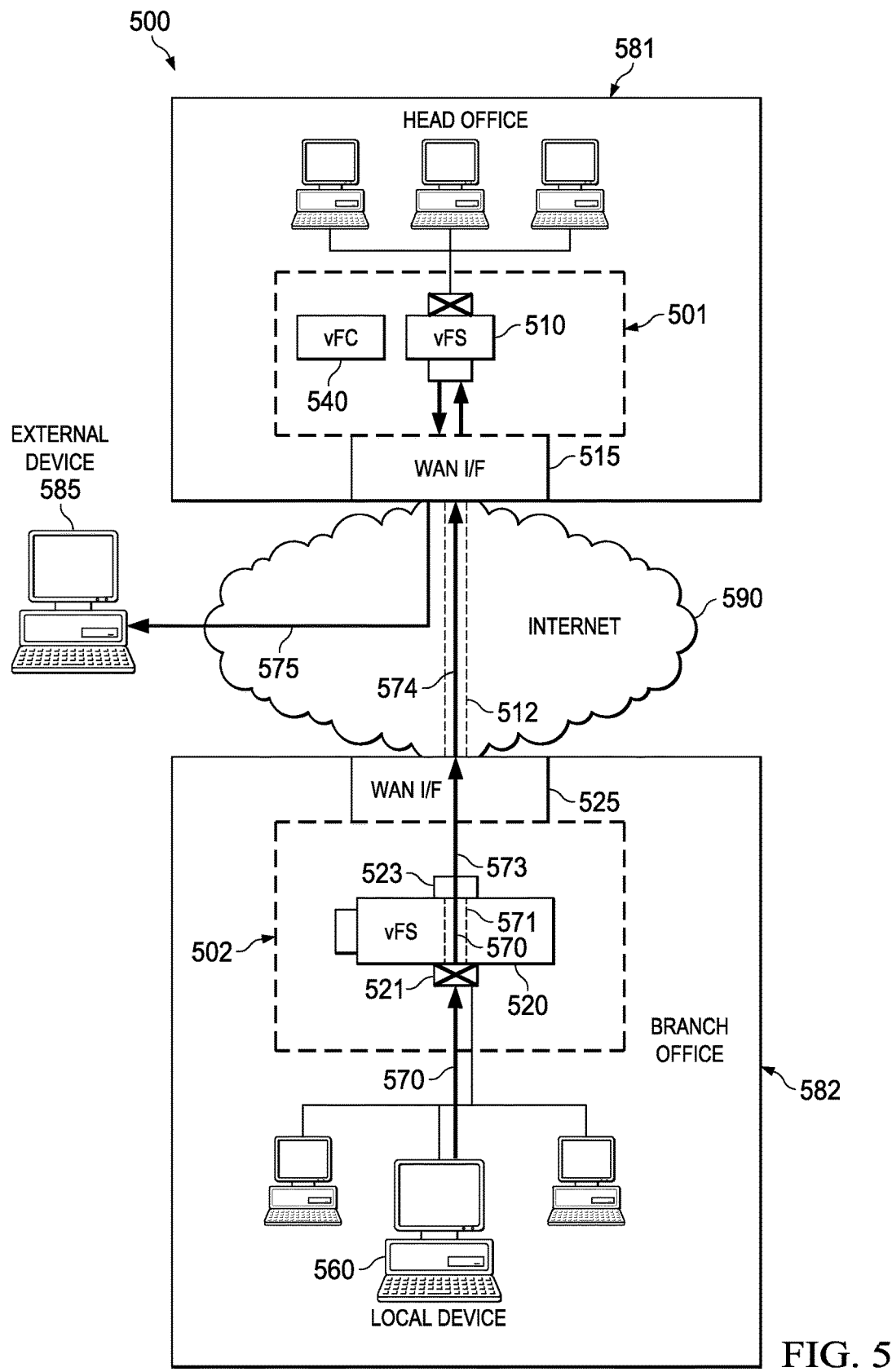
FIG. 5 illustrates a diagram of an embodiment virtual edge router adapted for central internet forwarding.

As mentioned above, default configurations of host devices positioned at branch office locations may be to tunnel outgoing internet traffic back to a host device positioned at the head-office location. For purposes of this disclosure, a WAN interface of a host device positioned at a head-office location is referred to as the "primary WAN interface" of the virtual edge routing network. FIG. 5 illustrates an edge router network 500 configured to communicate internet traffic over a primary internet interface. For purposes of this disclosure, a WAN interface of a host device positioned at a head-office location is referred to as the "primary internet interface" of the virtual edge routing network. As shown, the edge router network 500 includes a virtual forwarding unit 510 and a virtual controller 540 instantiated on a distributed host device 501 in a head-office location 581, and a virtual forwarding unit 520 instantiated on a distributed host device 502 in a branch office location 582. The virtual forwarding unit 520 is configured to communicate with the virtual forwarding unit 510 by forwarding traffic over a data tunnel 512 extending from a WAN interface 525 of the host device 502 to a WAN interface 525 of the host device 501. The data tunnel 512 extends through a public internet 590.

In this example, a local device 560 initiates a communication session with an external device 585. Specifically, the local device 560 forwards a packet 570 to a LAN port 521 of the virtual forwarding unit 520. The packet 570 may be carrying data to the external device 585, or may be requesting that the external device provide content or a service to the local device 560. Accordingly, the packet 570 may specify a global IP address of the external host device 585 as a destination address of the packet 570. Upon receiving the packet 570, the virtual forwarding unit 520 may search a routing table to identify an entry associated with the destination address of the packet 570, and may determine (based on the identified entry) that an a next-hop address for the packet 570 is an IP address of the WAN interface 515. Accordingly, the virtual forwarding unit 520 may encrypt the packet 570 to obtain an encrypted packet 573, and then forward the encrypted packet 573 over the WAN port 523 to the WAN interface 525. More specifically, the packet 570 is forwarded over a virtual data pathway 571 to the WAN port 523, where it is encrypted using a data tunnel password prior to being forwarded to the WAN interface 525. Notably, the virtual forwarding unit 520 may be a virtual machine, and therefore the LAN port 521, WAN port 523, and virtual data pathway 571 may be virtual representations of processes performed by that virtual machine.

The WAN interface 525 may then encapsulate the encrypted packet 573 to obtain an encapsulated packet 574 specifying an IP address of the WAN interface 515 (e.g., the next-hop address associated with the destination address of the original packet). The encapsulated packet 574 is then forwarded over the data tunnel 512 to the WAN interface 515 of the host device 501, wherein it is de-capsulated and decrypted to obtain an IP packet 575. The host device 501 then forwards the IP packet 575 over the internet 590 to the external device 585.

Notably, the encapsulated packet 575 (in FIG. 5) specifies the IP address of the host device 501, and therefore does not provide the external device 585 with the IP address of the host device 502. As such, traffic communicated from the external device 585 to the local device 560 is also routed through the host device 501. Tunneling traffic from the branch office 582 to the head office 581 may increase congestion within the virtual edge router 500 as well as introduce additional latency into the communications session between the local device 560 and the external device 585.

Figure 6A:
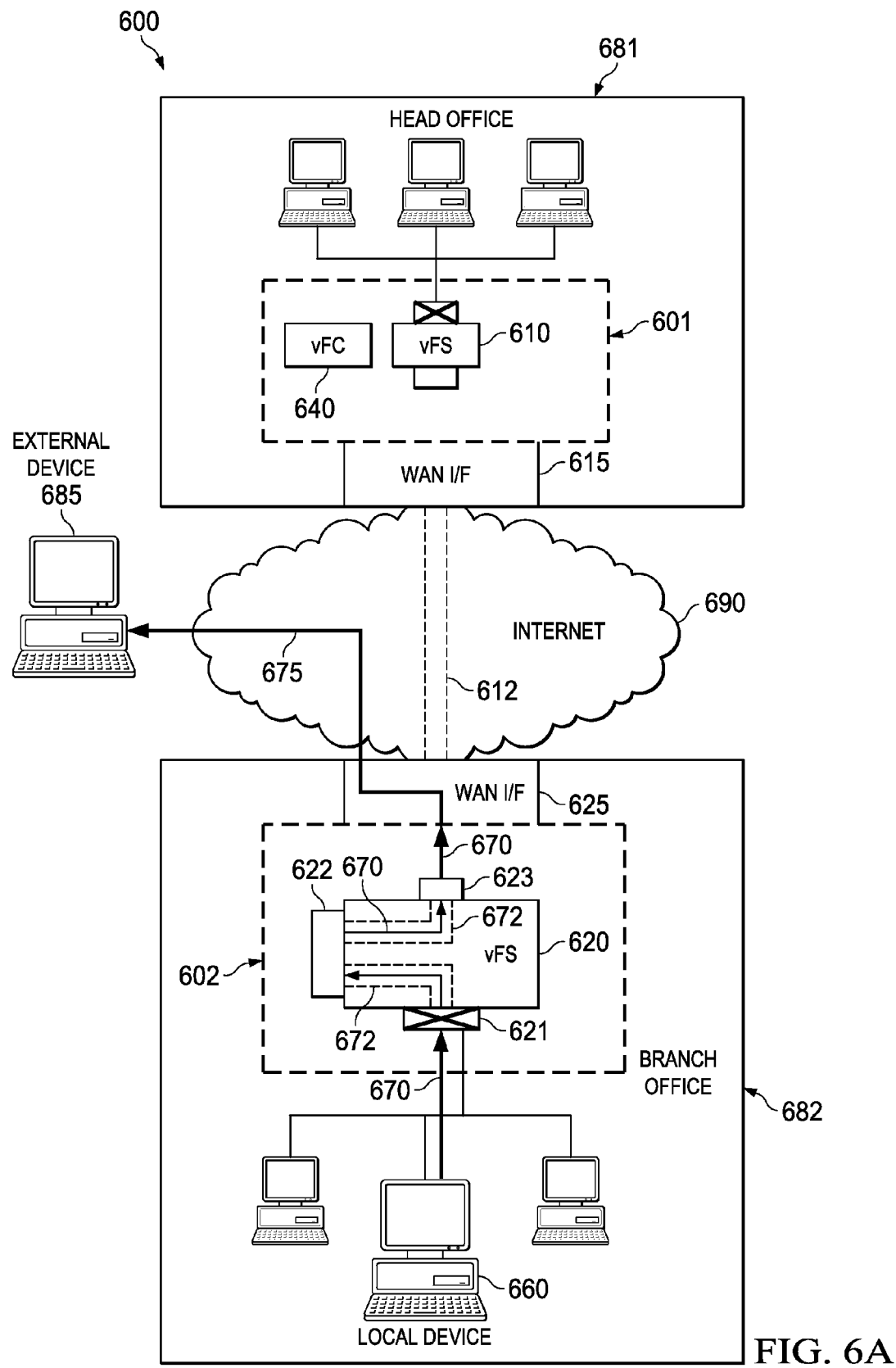
FIGS. 6A-6B illustrate diagrams of an embodiment virtual edge router adapted for local internet forwarding.
Figure 6B:
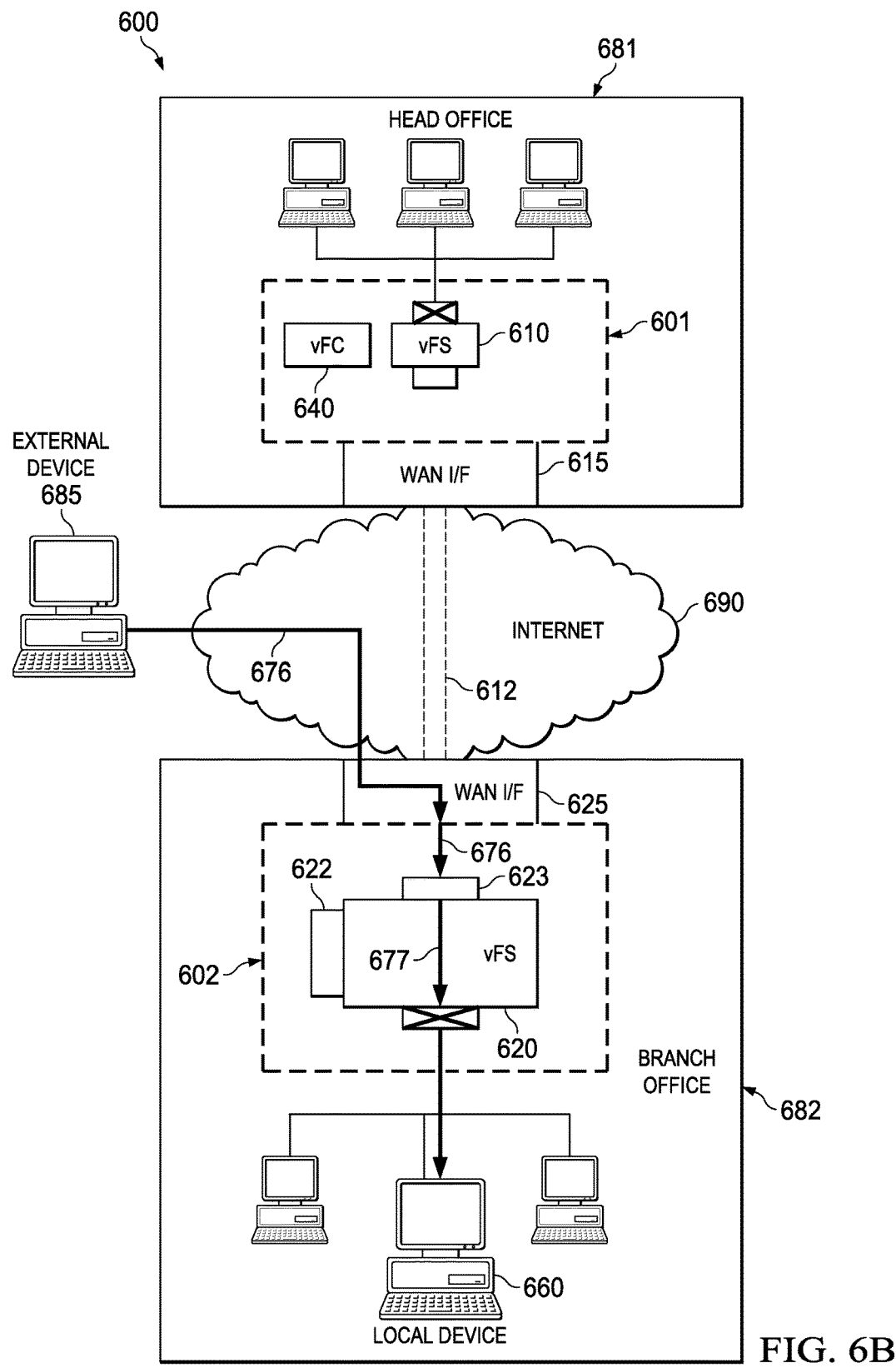

Aspects of this disclosure provide techniques for communicating internet traffic originating from branch office locations directly over the internet, thereby avoiding delays and congestion associated with tunneling the traffic from the branch-office location to the head-office location. FIGS. 6A-6B illustrate an edge router network 600 configured to communicate local internet traffic directly over the internet. As shown, the edge router network 600 includes a distributed host device 601 positioned in a head-office 681 of an SMB client as well as a distributed host device 602 positioned in a branch-office 682 of the SMB client. A virtual forwarding unit 610 and a virtual controller 640 are instantiated on the distributed host device 601, while a virtual forwarding unit 620 is instantiated on the distributed host device 602. The virtual forwarding unit 620 is configured to communicate with the virtual forwarding unit 610 by forwarding traffic over a data tunnel 612 extending from a WAN interface 625 of the host device 602 to a WAN interface 625 of the host device 601. The data tunnel 612 extends through a public internet 690.

The edge router network 600 may be similar to the edge router network 500, in that a local device 660 initiates a communications session with an external device 685. However, as shown in FIG. 6A, the edge router network 600 is unique in that the local host device 602 is configured to communicate outgoing internet traffic directly over the internet 690, rather than forwarding it over the remote host device 601. Specifically, local device 660 forwards a packet 670 to a LAN port 621 of the virtual forwarding unit 620, where the packet 670 is classified as local internet traffic and forwarded directly over the internet. For example, the virtual forwarding unit 620 may determine that a next-hop address of the packet 670 is the primary internet interface of the edge router network 600, and then forward the packet 670 over a local internet virtual pathway 672 to the WAN port/interface 623/625.

In an embodiment, the virtual forwarding unit 620 identifies the next hop address of the packet 670 by searching a forwarding table for an entry associated with the destination address of the packet 670. Thereafter, the virtual forwarding unit 620 determines that the next-hop address of the packet 670 is tagged in an egress table, which indicates that the next-hop address of the packet 670 is the primary internet interface of the edge router network 600.

The virtual forwarding unit 620 then forwards the packet over a local internet virtual pathway 672 to the WAN port/interface 623/625, where the packet 670 is encapsulated to form an encapsulated packet 675. The encapsulated packet 675 is then forwarded directly from the WAN port/interface 623/625 over the internet 690. In some embodiments, the WAN interface 625 and the WAN port 623 are the same port/interface.

The encapsulated packet 675 may specify the IP address of the WAN interface 625 as the source address of the packet 675, which may allow the external device 685 to deliver an ingress internet packet 676 directly to the host device 602 as shown in FIG. 6B. More specifically, the virtual forwarding unit 620 may be configured to monitor outgoing local internet traffic for the purposes of creating and tracking local internet sessions. In this example, the virtual forwarding unit 620 establishes a new local internet session upon forwarding the packet 670 over the local internet virtual pathway 672. The local internet session associates the destination IP address of the packet 670 (e.g., the IP address of the external device 685) with header information of the packet 670, e.g., TCP/UDP port information, etc. Thereafter, the existing internet session is used to filter incoming traffic. In this example, the virtual remote agent 620 receives an incoming packet 676 from the external device 685. The incoming packet 676 is filtered according to a table (or record) of existing local internet sessions, and is determined to be associated with the local internet session established during the forwarding of the packet 670 over the local internet virtual pathway 672. More specifically, the source IP address and header information (e.g., port number, port type, etc.) of the packet 676 is matched to the information in a table entry (or record) associated with that local internet session. Thereafter, the packet 676 is encapsulated into the packet 677 specifying the local IP address of the local device 660, and forwarded over the LAN port 621 to the local device 660.

Figure 7:
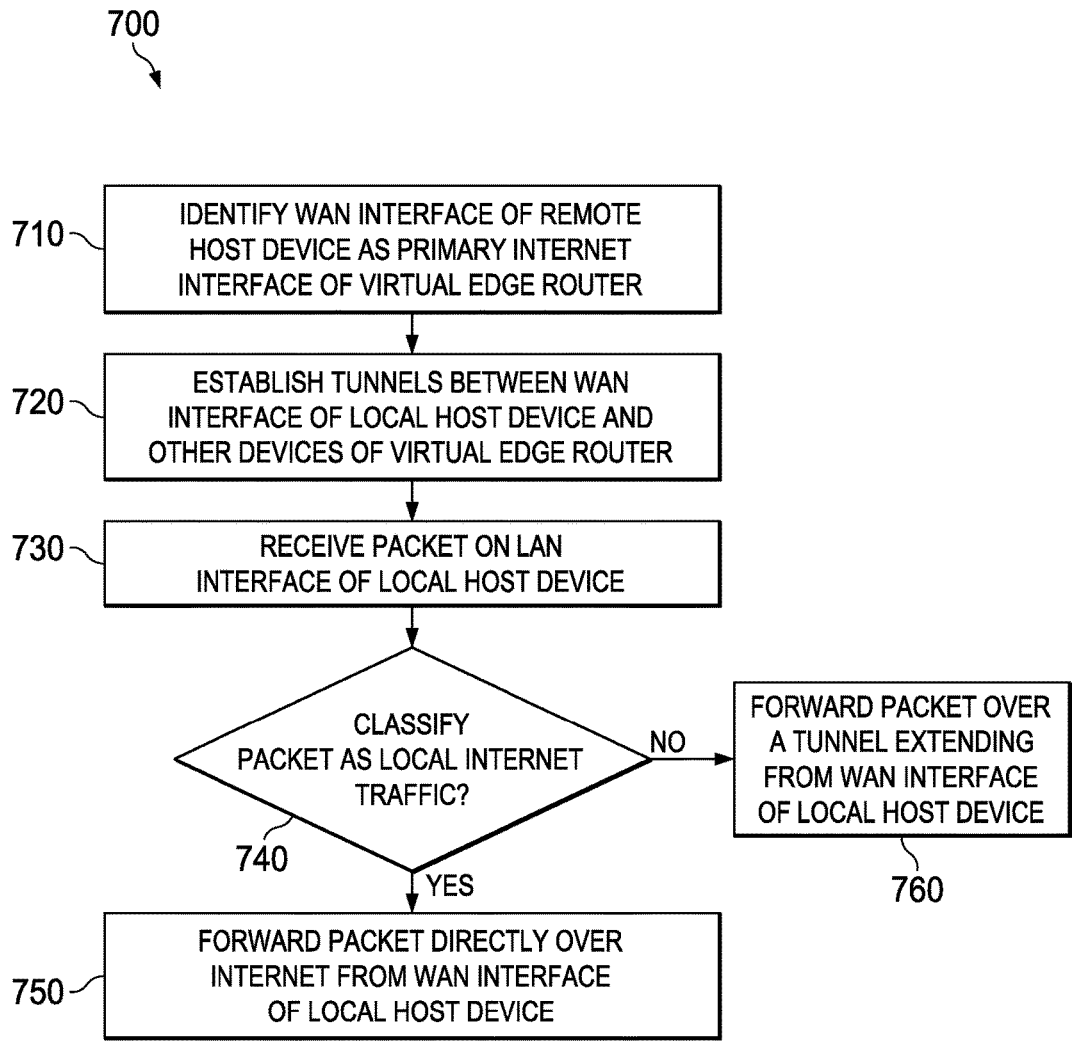
FIG. 7 illustrates a flowchart of a method for performing local internet forwarding at a branch-office location of an SMB client.

Aspects of this disclosure provide techniques for local internet forwarding at a branch-office location of an SMB client. FIG. 7 illustrates a method 700 for performing local internet forwarding at a branch-office location of an SMB client, as may be performed by a local host device. As shown, the method 700 begins with step 710, where the local host device identifies a WAN interface of a remote host device as a primary internet interface of a virtual edge router. In an embodiment, this step occurs upon receiving routing tables from a virtual network controller of the virtual edge router.

Next, the method 700 proceeds to step 720, where the local host device establishes tunnels between the WAN interface of the local host device and other devices (e.g., host devices, server, etc.) of the virtual edge router. Thereafter, the method 700 proceeds to step 730, where the local host device receives a packet over a LAN interface of the local host device. The packet may have been communicated from a local device in the branch office location of the SMB client. Subsequently, the method 700 proceeds to step 740, where the local host device determines whether to classify the packet as local internet traffic. In an embodiment, this includes determining whether a next-hop of the packet is flagged in an egress table as an egress interface of the virtual edge router. In another embodiment, this includes determining whether a next-hop of the packet is the same as an IP address associated with the primary internet interface of the virtual edge router. If it is appropriate to classify the packet as local internet traffic, then the local host device forwards the packet directly over the internet from the WAN interface of the local host device at step 750. Otherwise, if the packet is not classified as local internet traffic, then the packet is forwarded over one of the tunnels extending from WAN interface at step 760.

Figure 8:
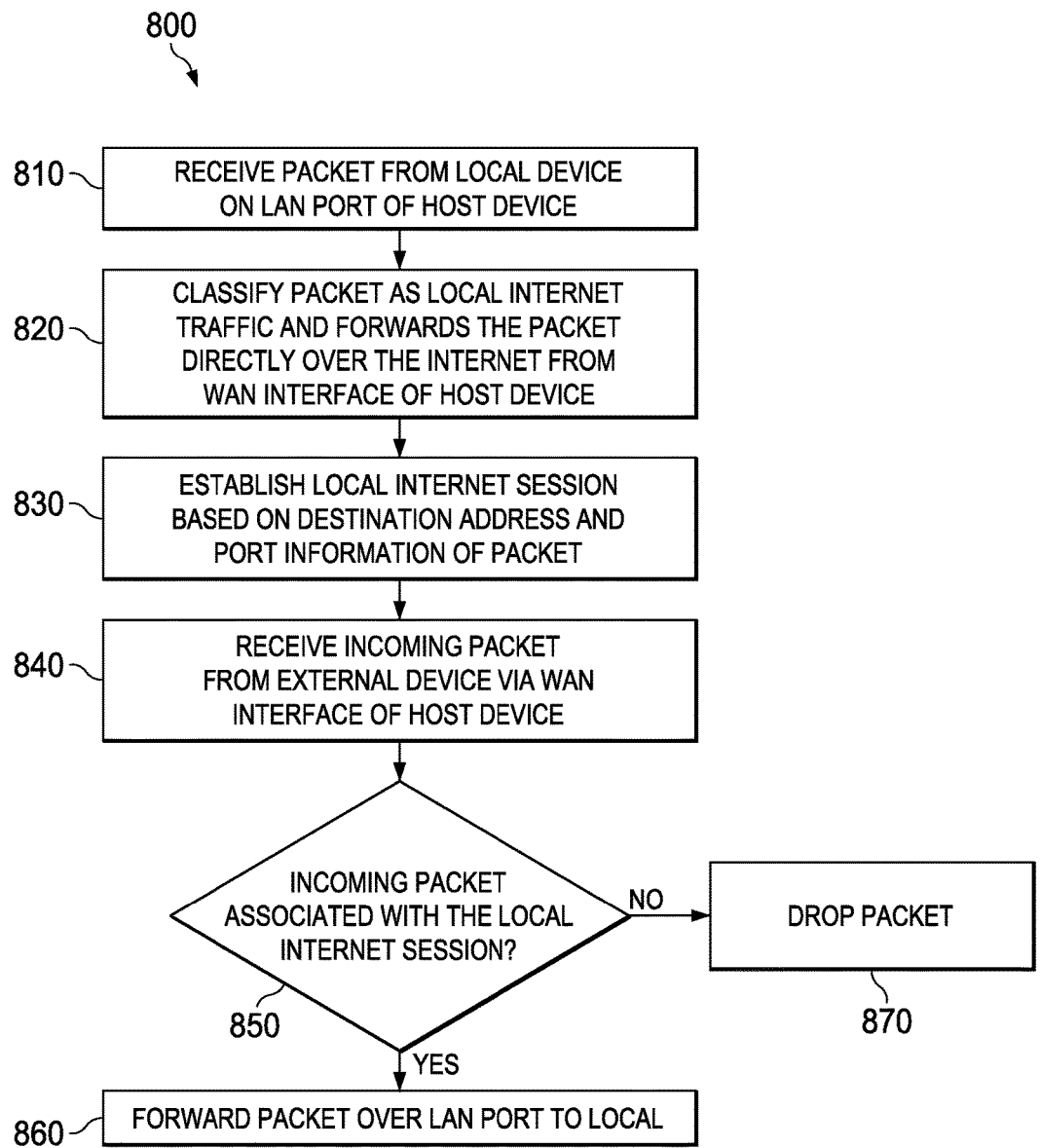
FIG. 8 illustrates a flowchart of a method for performing local internet filtering at a branch-office location of an SMB client.

Aspects of this disclosure provide techniques for local internet filtering at branch office locations of an SMB client. FIG. 8 illustrates a method 800 for performing local internet filtering at a branch-office location of an SMB client, as may be performed by a host device. As shown, the method 800 begins with step 810, where the host device receives a packet from a local device on LAN port of the host device. Next, the method 800 proceeds to step 820, where the host device classifies the packet as local internet and forwards the packet directly over the internet from a WAN interface of the host device. Thereafter, the method 800 proceeds to step 830, where the host device establishes a local internet session based on the destination address and port information of the packet.

Next, the method 800 proceeds to step 840, where the host device receives an incoming packet from an external device via the WAN interface of the host device. Thereafter, the method 800 proceeds to step 850, where the host device determines whether the incoming packet is associated with the local internet session. A host device may track multiple existing local internet sessions during the same period. However, for the purposes of this example, it is assumed that the local internet session created at step 830 is the only existing local internet session tracked by the host device. If the incoming packet is associated with the local internet session, then it is forwarded over the LAN port to the local device at step 860. Otherwise, if the incoming packet is not associated with the local internet session, then the packet is dropped at step 870.

In an embodiment, the local internet virtual connection is configured through a command line interface to indicate to the system that the interface provides a path from the distributed router to the inter-office network. Within the system, a "local internet attribute" is associated on the interface and then distributed out to every distributed host in an "egress table," which contains all "attributes" associated with interfaces of the virtual edge router. In any embodiment, some local interfaces (e.g., LAN interfaces) of a host device may be enabled for local internet, while others may not. In such an embodiment, only outgoing traffic from those interfaces enabled for local internet may be classified for local internet.

On an individual virtual host device, the local internet port is a virtual interface associated with the "local internet" attribute. When the local-internet attribute is assigned, the virtual interface will be assigned an IP address of the WAN interface on the distributed host device. The local-internet will be "internally" attached to the WAN interface such that from that point onward, outgoing traffic on the "local internet" interface, will be redirected out the WAN interface. In an embodiment, all incoming traffic received on the WAN interface (other than inter-vFS control traffic) is redirect from the WAN interface into the "local internet" interface.

Figure 9:
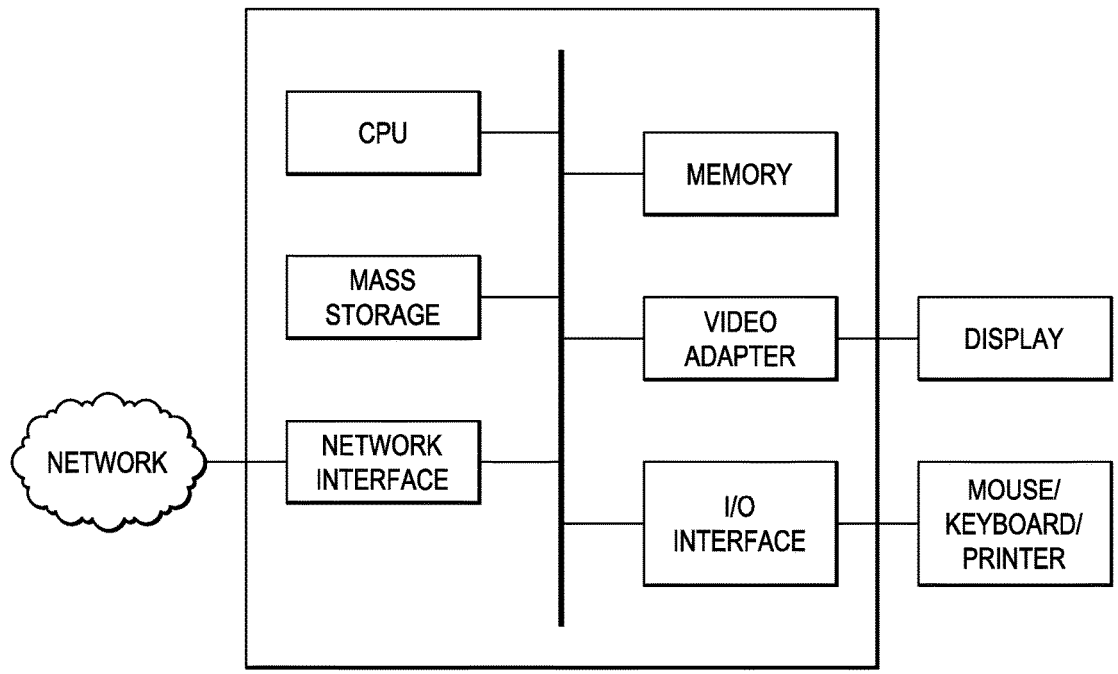
FIG. 9 illustrates a diagram of an embodiment computing platform.

FIG. 9 illustrates a block diagram of a processing system that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input/output devices, such as a speaker, microphone, mouse, touchscreen, keypad, keyboard, printer, display, and the like. The processing unit may include a central processing unit (CPU), memory, a mass storage device, a video adapter, and an I/O interface connected to a bus.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces, which may comprise wired links, such as an Ethernet cable or the like, and/or wireless links to access nodes or different networks. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Figure 10:
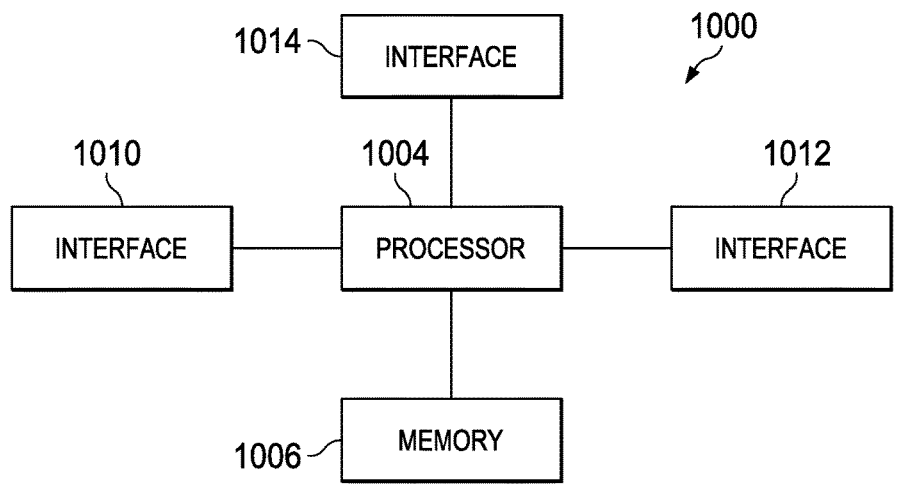
FIG. 10 illustrates a diagram of an embodiment communications device.

FIG. 10 illustrates a block diagram of an embodiment of a communications device 1000, which may be equivalent to one or more devices (e.g., UEs, NBs, etc.) discussed above. The communications device 1000 may include a processor 1004, a memory 1006, and a plurality of interfaces 1010, 1012, 1014, which may (or may not) be arranged as shown in FIG. 10. The processor 1004 may be any component capable of performing computations and/or other processing related tasks, and the memory 1006 may be any component capable of storing programming and/or instructions for the processor 1004. The interfaces 1010, 1012, 1014 may be any component or collection of components that allows the communications device 1000 to communicate with other devices.

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method for providing efficient internet access to distributed hosts of a virtual edge router, the method comprising:
   establishing data tunnels between a wide area network (WAN) interface of a local host device and WAN interfaces of a plurality of remote host devices, wherein a WAN interface of a remote host device is a primary internet interface of the virtual edge router;
   creating, within the local host device, a virtual data pathway and a local internet virtual pathway between a local area network (LAN) interface of the local host device and the WAN interface, the virtual data pathway being separate and distinct from the local internet virtual pathway, wherein the WAN interface of the local host device is configured to forward data traffic received on the virtual data pathway over the data tunnels of the virtual edge router and to forward local internet traffic received on the local internet virtual pathway directly over the internet;
   receiving a first data packet from a source device over the LAN interface of the local host device;
   classifying the first data packet as local internet traffic upon determining that a destination address of the first data packet is tagged as a global IP address assigned to the primary internet interface of the virtual edge router in an egress table; and
   forwarding the first data packet over the local internet virtual pathway in response to classifying the first data packet as local internet traffic, thereby prompting the WAN interface of the local host device to forward the first data packet directly over the internet to an IP address of an external device without the first data packet being relayed via the remote host device over the primary internet interface of the virtual edge router, the external device being a different device than the remote host device, and the IP address of the external device being different than the global IP address of the remote host device.

2. The method of claim 1, further comprising:
   creating, within the local host device, virtual data pathways for transporting internal data traffic to the WAN interface of the local host device, wherein the WAN interface of the local host device is configured to forward internal data traffic received on the virtual data pathways over the data tunnels of the virtual edge router;
   receiving a second data packet over the LAN interface of the local host device;
   classifying the second data packet as internal data traffic; and
   forwarding the second data packet over one of the virtual data pathways, thereby prompting the WAN interface of the local host device to communicate the second data packet over one of the data tunnels of the virtual edge router.

3. The method of claim 1, further comprising:
   creating, in a table of existing internet sessions, a first entry corresponding to a local internet session of the first data packet, wherein the first entry associates a destination address of the first data packet with header information of the first data packet;

receiving an incoming packet on the WAN interface of the local host device, the incoming packet being communicated directly over the internet without having been transported over the data tunnels extending to the WAN interface of the local host device; and filtering the incoming packet based on the table of existing internet sessions.

4. The method of claim 3, wherein filtering the incoming packet comprises:

dropping the incoming packet when a source address of the incoming packet is not associated with an entry in the table of existing internet sessions.

5. The method of claim 3, wherein filtering the incoming packet comprises:

determining that a source address of the incoming packet matches the destination address specified by the first entry;

dropping the incoming packet when header information of the incoming packet does not match the header information specified by the first entry; and processing the incoming packet when header information of the incoming packet matches the header information specified by the first entry.

6. The method of claim 5, wherein processing the incoming packet comprises:

identifying a local IP address assigned to the source device of the first data packet;

appending the local IP address to the incoming packet to obtain a second data packet; and forwarding the second data packet over the LAN interface of the local host device.

7. A computer program product adapted for installation on a local host device of a virtual edge router, the computer program product comprising a non-transitory computer readable storage medium storing programming that includes instructions to:

establish data tunnels between a wide area network (WAN) interface of a local host device and WAN interfaces of a plurality of remote host devices, wherein a WAN interface of a remote host device is a primary internet interface of the virtual edge router;

create, within the local host device, a virtual data pathway and a local internet virtual pathway between a local area network (LAN) interface of the local host device and the WAN interface, the virtual data pathway being separate and distinct from the local internet virtual pathway, wherein the WAN interface of the local host device is configured to forward data traffic received on the virtual data pathway over the data tunnels of the virtual edge router and to forward local internet traffic received on the local internet virtual pathway directly over the internet;

receive a first data packet from a source device over the LAN interface of the local host device;

classify the first data packet as local internet traffic upon determining that a destination address of the first data packet is tagged as a global IP address assigned to the primary internet interface of the virtual edge router; and forward the first data packet over the local internet virtual pathway in response to classifying the first data packet as local internet traffic, thereby prompting the WAN interface of the local host device to forward the first data packet directly over the internet to an IP address of an external device without the first data packet being relayed via the remote host device over the primary internet interface of the virtual edge router, the external device being a different device than the remote host device, and the IP address of the external device being different than the global IP address of the remote host device.

8. The computer program product of claim 7, wherein the programming further includes instructions to:

create, within the local host device, virtual data pathways for transporting internal data traffic to the WAN interface of the local host device, wherein the WAN interface of the local host device is configured to forward internal data traffic received on the virtual data pathways over the data tunnels of the virtual edge router receive a second data packet over the LAN interface of the local host device;

classify the second data packet as internal data traffic; and forward the second data packet over one of the virtual data pathways, thereby prompting the WAN interface of the local host device to communicate the second data packet over one of the data tunnels of the virtual edge router.

9. The computer program product of claim 7, wherein the global IP address assigned to the WAN interface of the remote host device is different than a global IP address assigned to the WAN interface of the local host device.

10. The computer program product of claim 7, wherein the programming further includes instructions to:

create, in a table of existing internet sessions, a first entry corresponding to a local internet session of the first data packet, wherein the first entry associates a destination address of the first data packet with header information of the first data packet;

receive an incoming packet on the WAN interface of the local host device, the incoming packet being communicated directly over the internet without having been transported over the data tunnels extending to the WAN interface of the local host device; and filter the incoming packet based on the table of existing internet sessions.

11. The computer program product of claim 10, wherein the instructions to filter the incoming packet include instructions to:

drop the incoming packet when a source address of the incoming packet is not associated with an entry in the table of existing internet sessions.

12. The computer program product of claim 10, wherein the instructions to filter the incoming packet include instructions to:

determine that a source address of the incoming packet matches the destination address specified by the first entry;

drop the incoming packet when header information of the incoming packet does not match the header information specified by the first entry; and process the incoming packet when header information of the incoming packet matches the header information specified by the first entry.

13. The computer program product of claim 12, wherein the instructions to process the incoming packet include instructions to:

identify a local IP address assigned to the source device of the first data packet;

append the local IP address to the incoming packet to obtain a second data packet; and forward the second data packet over the LAN interface of the local host device.

14. A local host device in a virtual edge router, the local host device comprising:

one or more local area network (LAN) interfaces, the one or more LAN interfaces including at least a first LAN interface communicatively coupled to a local device;

a wide area network (WAN) interface, wherein data tunnels of the virtual edge router interconnect the WAN interface of the local host device to WAN interfaces of remote host devices, wherein a WAN interface of a remote host device is a primary internet interface of the virtual edge router;

a virtual data pathway and a local internet virtual pathway extending between the first LAN interface of the local host device and the WAN interface of the local host device, wherein the WAN interface of the local host device is configured to forward data traffic received on the virtual data pathway over the data tunnels of the virtual edge router and to forward local internet traffic received on the local internet virtual pathway directly over the internet; and one or more processors individually or collectively configured to classify a first data packet received over the first LAN interface as local internet traffic when a destination address of the first data packet is a global IP address assigned to the primary internet interface of the virtual edge router, and to forward the first data packet over the local internet virtual pathway in response to classifying the first data packet as local internet traffic, thereby prompting the WAN interface of the local host device to communicate the first data packet directly over the internet to an IP address of an external device without the first data packet being relayed via the remote host device over the primary internet interface of the virtual edge router, the external device being a different device than the remote host device, and the IP address of the external device being different than the global IP address of the remote host device.

15. The local host device of claim 14, further comprising:
one or more virtual data pathways for transporting data traffic to the WAN interface of the local host device, wherein the WAN interface of the local host device is configured to forward data traffic received on the one or more virtual data pathways over the data tunnels of the virtual edge router, and wherein the one or more processors are further configured to classify a second data packet received over the one or more LAN interfaces as internal data traffic, and to forward the second data packet over one of the virtual data pathways, thereby prompting the WAN interface of the local host device to communicate the second data packet over one of the data tunnels of the virtual edge router.

16. The local host device of claim 14, wherein the one or more processors are further configured to:
create, in a table of existing internet sessions, a first entry corresponding to a local internet session of the first data packet, wherein the first entry associates a destination address of the first data packet with header information of the first data packet;
receive an incoming packet on the WAN interface of the local host device, the incoming packet being communicated directly over the internet without having been transported over the data tunnels extending to the WAN interface of the local host device; and
filter the incoming packet based on the table of existing internet sessions.

17. The local host device of claim 16, wherein the one or more processors are further configured to:
drop the incoming packet when a source address of the incoming packet is not associated with an entry in the table of existing internet sessions.

18. The local host device of claim 16, wherein the one or more processors are further configured to:
determine that a source address of the incoming packet matches the destination address specified by the first entry;
drop the incoming packet when header information of the incoming packet does not match the header information specified by the first entry; and
process the incoming packet when header information of the incoming packet matches the header information specified by the first entry.

19. The local host device of claim 14, wherein the global IP address assigned to the WAN interface of the remote host device is different than a global IP address assigned to the WAN interface of the local host device.

* * * * *